US008977676B2

(12) United States Patent
Segawa

(10) Patent No.: US 8,977,676 B2
(45) Date of Patent: Mar. 10, 2015

(54) NUMERICAL VALUE MANAGEMENT SYSTEM AND METHOD FOR MANAGING NUMERICAL VALUE

(75) Inventor: Yusuke Segawa, Tokyo (JP)

(73) Assignee: BIGLOBE Inc., Tokyo (JP)

( * ) Notice: Subject to any disclaimer, the term of this patent is extended or adjusted under 35 U.S.C. 154(b) by 855 days.

(21) Appl. No.: 12/899,340

(22) Filed: Oct. 6, 2010

(65) Prior Publication Data

US 2011/0082901 A1 Apr. 7, 2011

(30) Foreign Application Priority Data

Oct. 7, 2009 (JP) ................................ 2009-233900

(51) Int. Cl.
*G06F 15/16* (2006.01)

(52) U.S. Cl.
USPC ........... 709/203; 715/205; 715/209; 715/221; 715/222; 715/276

(58) Field of Classification Search
CPC . G06F 17/211; G06F 17/214; G06F 17/2247; G06F 17/24
USPC .......................... 715/205, 209, 221, 222, 276
See application file for complete search history.

(56) References Cited

U.S. PATENT DOCUMENTS

2008/0133520 A1* 6/2008 Hempleman et al. ............. 707/6
2008/0154953 A1* 6/2008 Kinouchi et al. .......... 707/104.1
2008/0201371 A1* 8/2008 Murakami ................ 707/104.1
2008/0288494 A1* 11/2008 Brogger et al. .................. 707/7
2011/0010307 A1* 1/2011 Bates et al. ................... 705/347
2011/0077988 A1* 3/2011 Cates et al. .................. 705/7.32

FOREIGN PATENT DOCUMENTS

JP 2002-150465 A 5/2002

* cited by examiner

*Primary Examiner* — Philip Chea
*Assistant Examiner* — Van Kim T Nguyen
(74) *Attorney, Agent, or Firm* — Sughrue Mion, PLLC

(57) ABSTRACT

There is provided a numerical value management system which includes a server device and a plurality of user terminals. Each user terminal generates title data to send to the server device when the title name is inputted, the server counts a number of users who create the title data for each title name based on the title data group to generate title compilation data indicating a relationship between the title name and a number of creating users. Further, a high-order title screen data is generated and sent to the user terminal when the server device obtains the high-order title reference request and the high-order title screen data is displayed on a screen in the user terminal.

19 Claims, 26 Drawing Sheets

Fig. 5

| TITLE IDENTIFIER | TITLE NAME | INPUT STYLE | PUBLIC/NONPUBLIC |
|---|---|---|---|
| 001 | WEIGHT | TEN-KEY | NONPUBLIC |
| 002 | TOBACCO | COUNT | PUBLIC |
| ⋮ | ⋮ | ⋮ | ⋮ |

Fig. 6

| USER IDENTIFIER | TITLE IDENTIFIER | TITLE NAME | INPUT STYLE | PUBLIC/NONPUBLIC |
|---|---|---|---|---|
| | TITLE DATA | | | |
| ... | ... | ... | ... | NONPUBLIC |
| AAA | 002 | TOBACCO | COUNT | PUBLIC |
| ... | ... | ... | ... | ... |

Fig. 7A

| TITLE NAME | INPUT STYLE | NUMBER OF CREATION USERS |
|---|---|---|
| ⋮ | ⋮ | ⋮ |
| WEIGHT | TEN-KEY | 153 |
| TOBACCO | COUNT | 124 |
| ⋮ | ⋮ | ⋮ |

Fig. 7B

| RANKING | TITLE NAME | NUMBER OF CREATION USERS |
|---|---|---|
| 1 | *** | |
| 2 | *** | |
| 3 | WEIGHT | 153 |
| 4 | *** | |
| 5 | *** | |
| 6 | *** | |
| 7 | TOBACCO | 124 |
| 8 | *** | |
| 9 | *** | |
| 10 | *** | |

Fig. 10

| TITLE IDENTIFIER | NUMERICAL DATA | DATE AND TIME |
|---|---|---|
| ⋮ | ⋮ | ⋮ |
| 001 | 65.2 | 2009/06/29<br>09 : 15 : 28 |
| 002 | 1 | 2009/06/29<br>10 : 05 : 32 |
| 002 | 1 | 2009/06/29<br>11 : 23 : 50 |
| ⋮ | ⋮ | ⋮ |

Fig. 11

| | MANAGEMENT DATA | | |
|---|---|---|---|
| USER IDENTIFIER | TITLE IDENTIFIER | NUMERICAL DATA | DATE AND TIME |
| ... | ... | ... | ... |
| AAA | 002 | 1 | 2009/06/29 10 : 05 : 32 |
| AAA | 002 | 1 | 2009/06/29 11 : 23 : 50 |
| ... | ... | ... | ... |

Fig. 22

| TITLE IDENTIFIER | TITLE NAME | COUNT STYLE | PUBLIC/NONPUBLIC |
|---|---|---|---|
| ⋮ | ⋮ | ⋮ | ⋮ |
| 008 | REPETITIVE EXERCISE (PUSH-UPS) | COUNT STYLE | PUBLIC |

TITLE DATA FOR MANAGEMENT OF REPETITIVE EXERCISE

NUMERICAL VALUE MANAGEMENT SYSTEM AND METHOD FOR MANAGING NUMERICAL VALUE

INCORPORATION BY REFERENCE

This patent application claims a priority on convention based on Japanese Patent Application No. 2009-233900. The disclosure thereof is incorporated herein by reference.

TECHNICAL FIELD

The present invention relates to a numerical value management system and a method for managing numerical value.

BACKGROUND ART

A numerical value management system for managing numerical data is known. In the numerical value management system, a title name and numerical data are associated with each other and stored as management data. When necessary, the stored management data is displayed on a display screen to be notified to a user. Thus, the management data is managed.

As a related technique, a display reading device is exemplified in Patent Literature 1 (JP2002-150465A). This display reading device includes a reading means for optically reading data displayed by a display device capable of electro-optically displaying a prescribed physical value as a numerical value, and recognizing means for recognizing the prescribed physical value based on the image data read by the reading means. This display reading device includes a discrimination means for discriminating a sort corresponding to the prescribed physical value among a plurality of sort of the predetermined physical value, based on the image data.

SUMMARY OF THE INVENTION

A target of the management should be decided by the user. However, there may be a case where the user can not conceive of the target of the management. The present inventor considered that, if the user can know what data is managed by other users, the user can easily determine the target of the management.

A numerical value management system according to the present invention includes: a server device comprising a title compiling part and a page generation part; and a plurality of user terminal, each of which is accessibly connected with the server device and comprises a new registration part and a title reference part. The new registration part is configured to generate title data including a title name of management data to send to the server device, when the title name is inputted into each of the plurality of user terminal. The title compilation part is configured to count a number of users who create the title data for each title name based on title data group obtained from the plurality of user terminal to generate title compilation data indicating a relationship between the title name and a number of creating users. The title reference part is configured to send a high-order title reference request to the server device. The page generation part is configured to generate high-order title screen data indicating title names in descending order of the number of creating users based on the title compilation data to send the high-order title screen data to the each user terminal when said server device receives the high-order title reference request. The title reference part is configured to display the high-order title screen data on a display screen.

A server device according to the present invention is the server device used in the above mentioned numerical value management system.

A user terminal according to the present invention is the user terminal used in the above mentioned numerical value management system.

A numerical value management method according to the present invention includes: generating title data including a title name of management data to send to the server device, by using each of plurality of user terminal; counting a number of users who create the title data for each title name based on title data group obtained from the plurality of user terminal to generate title compilation data indicating a relationship between the title name and a number of creating users, by using the server device; sending a high-order title reference request to the server device, by using the each user terminal; receiving the high-order title reference request and generating high-order title screen data indicating title names in descending order of the number of creating users based on the title compilation data to send the high-order title screen data to the each user terminal, by using the server device; and displaying the high-order title screen, data on a display screen, by using the each user terminal.

The numerical value management program according to the present invention is a program for realizing the above mentioned numerical value management method by computers.

According to the present invention, a numerical value management system and a numerical value management program are provided, by which a user can know what data is managed by other users.

BRIEF DESCRIPTION OF THE DRAWINGS

FIG. 5 is a conceptual diagram showing information stored in a title data table;

FIG. 6 is a conceptual diagram showing information stored in a title data table;

FIG. 7A is a conceptual diagram showing a title counting table;

FIG. 7B is a conceptual diagram showing high-order title screen data;

FIG. 10 is a conceptual diagram showing information stored in a management data table;

FIG. 11 is a conceptual diagram showing contents of user data table;

FIG. 22 is a conceptual diagram showing contents of a title data table; and

EXEMPLARY EMBODIMENTS

With reference to the drawings, embodiments of the present invention will be explained below.

First Embodiment

Figure 1:
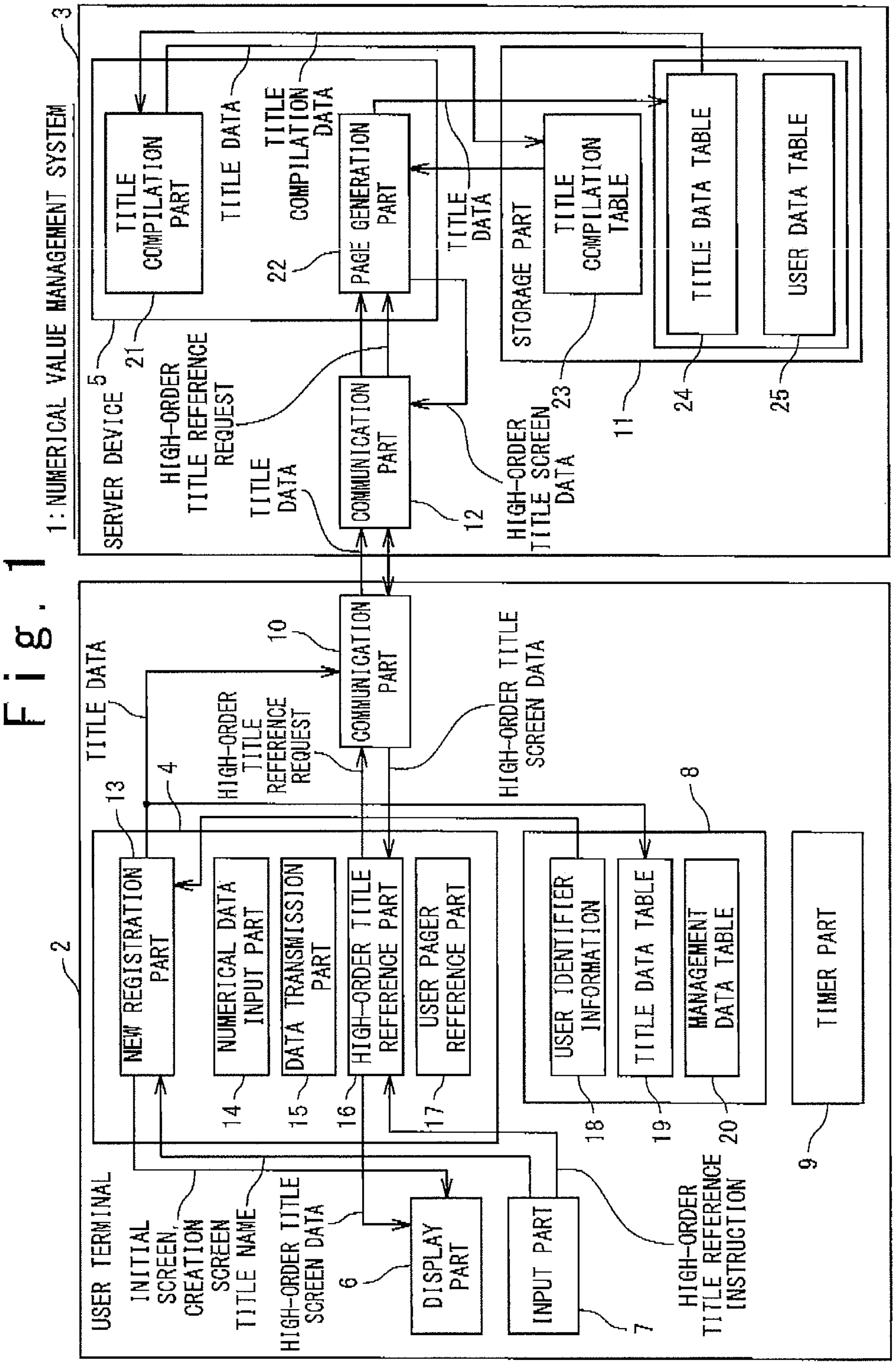
FIG. 1 is a block diagram showing a numerical value management system according to a first embodiment.

FIG. 1 is a block diagram showing a numerical value management system 1 according to a first embodiment. The numerical value management system 1 according to the present embodiment is used for managing management data. The management data includes an association relation between a title name and numerical data. As shown in FIG. 1, the numerical value management system 1 includes a server device 3 and a user terminal 2. The user terminal 2 is accessibly connected with the server device 3 via a network (not shown). Although not shown in FIG. 1, a plurality of user terminal 2 are connected with one server device 3.

The user terminal 2 is operated by a user. The user terminal 2 has a function of managing the management data. As shown in FIG. 1, the user terminal 2 includes a display part 6, an input part 7, a storage part 8, a timer part 9, a communication part 10, a new registration part 13, a numerical data input part 14, a data transmission part 15, a high-order title reference part 16 and a user page reference part 17. Among these parts, the new registration part 13, the numerical data input part 14, the data transmission part 15, the high-order title reference part 16 and the user page reference part 17 are realized by a CPU executing a user side numerical value management program 4 that is stored in a storage medium such as a ROM (Read Only Memory).

The storage part 8 is realized by a storage medium such as a hard disc, and stores user identifier information 18 for identifying the user, a title data table 19, and a management data table 20.

The display part 6 is provided for informing a user of information, and includes a display screen. The input part 7 is provided for receiving information from the user. In the present embodiment, it is assumed that the display part 6 and the input part 7 are constituted with a touch panel.

The communication part 10 is realized by an antenna or the like, and has a function of transmitting and receiving data to and from the server device 3.

The server device 3 is provided for compiling information received from the plurality of user, terminal 2. Further, the server device 3 has a function of generating appropriate information in accordance with contents of requests transmitted from the user terminals 2 and responding to the user terminals 2. The server device 3 includes a communication part 12, a storage part 11, a title compilation part 21, and a page generation part 22. Among these parts, the title compilation part 21 and the page generation part 22 are realized by a CPU executing a server side numerical value management program 5 that is stored in a storage medium such as a ROM.

The communication part 12 has a function for transmitting and receiving data to and from the user terminals 2.

The storage part 11 is realized by a storage medium such as a hard disc and stores a title compilation table 23, a title data table 11 and a user data table 25.

Subsequently, operation methods of the numerical value management system 1 will be described below.

[Creation of New Data]

Figure 2A:
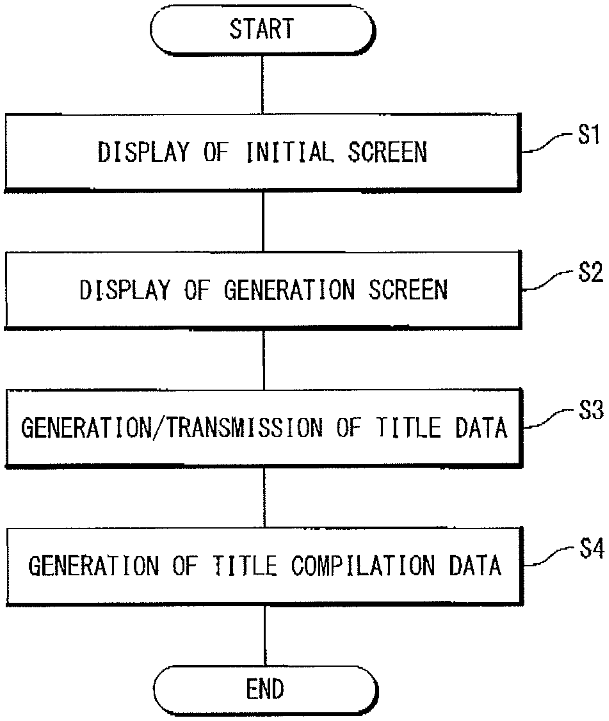
FIG. 2A is a flow chart showing an operation method for newly creating management data.

Firstly, an operation for newly creating management data will be explained. FIG. 2A is a flow chart showing an operation method for newly creating management data.

Step S1; Display of Initial Screen

Figure 3:
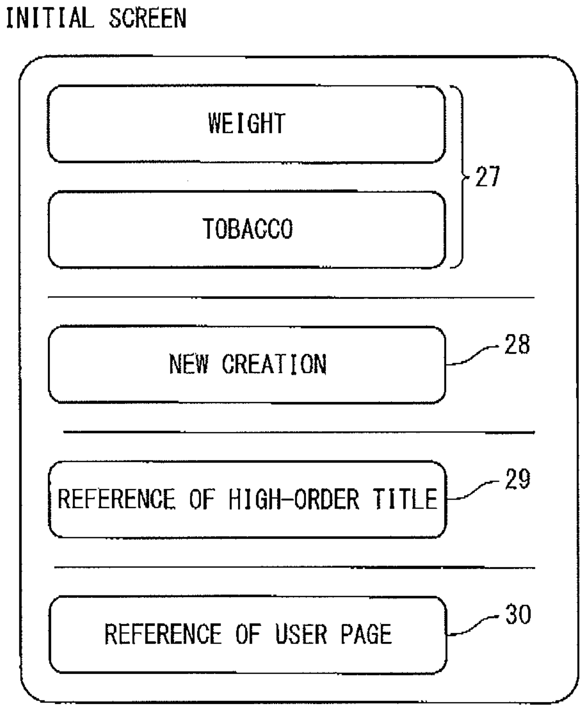
FIG. 3 is a conceptual diagram showing an initial screen.

The new registration part 13 displays an initial screen on the display screen of the display part 6. FIG. 3 is a conceptual diagram showing the initial screen. As shown in FIG. 3, on the initial screen, a title name designation button 27, a new creation button 28, a high-order title reference button 29 and a user page reference button 30 are displayed. When crating new data, the user selects the new creation button 28 with using the input part 7.

Step S2; Display of a Creation Screen

Figure 4:
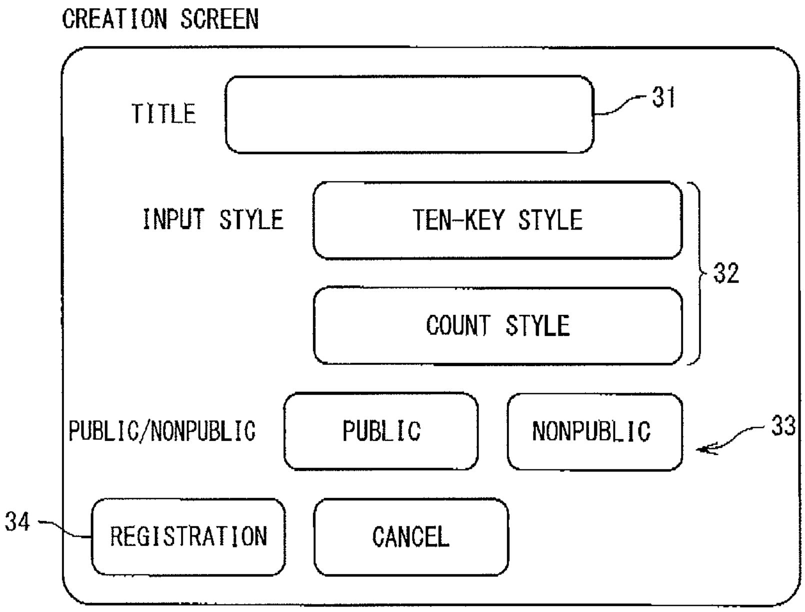
FIG. 4 is a conceptual diagram showing a creation screen.

When the new creation button 28 is selected, the new registration part 13 displays a creation screen on the display part 6. FIG. 4 is a conceptual diagram showing the creation screen. As shown in FIG. 4, the creation screen includes a title name input region 31, an input style designation region 32, a public/nonpublic designation region 33 and a registration button 34. The term "public/nonpublic" means existence or nonexistence of publication in this specification. The title name input region 31 is provided for inputting a title name of management data. The input style designation region 32 is provided for designating an input style for inputting the numerical data. In the present embodiment, a "ten-key style" or a "count style" can be designated as the input style. The public/nonpublic designation region 33 is provided for designating whether or not the management data is opened to public for other users. The user designates the title name, the input style and the public/nonpublic with using the input part 7, and than selects the registration button 34.

Step S3; Generation/Transmission of Title Data

When the registration button 34 is selected, the new registration part 13 obtains the designated information (title name, input style and public/nonpublic). The new registration part 13 adds a title identifier for identifying the designated title name to the obtained information, and stores the resultant information in the title data table 19 as title data. The title data is data including at least a title name. In the present embodiment, the title data indicates an association relation among the title identifier, the title name, the input style and the public/nonpublic. FIG. 5 is a conceptual diagram showing the information stored in the title data table 19. As shown in FIG. 5, the association relation among the title identifier, the title name, the input style and the public/nonpublic is described in the title data table 19. It is noted that the title data may include other information such as a unit of the inputted numerical value, and the other information may be inputted in the creation screen of Step S2.

Thereafter, it becomes possible to manage the management data including the designated title name in the user terminal 2. That is, when the numerical data corresponding to "title name" is inputted into the user terminal 2, the "numerical data" is associated with the "title name" to be stored in the storage part 8 as the management data. Further, when displaying the initial screen, the new registration part 13 adds a button indicating a title name included in the title data generated in the present step as the title name designation button 27. An operating method of inputting the numerical data will be described later.

Herein, when the title data is generated, the new registration part 13 further refers to the user identifier information, and obtains a user identifier. Then, the user identifier is added to the title data to be transmitted to the server device 3 via the communication part 10.

In the server device 3, the page generation part 22 obtains the title data via the communication part 12. The page generation part 22 associates the user identifier with the title data and stores the resultant data in the title data table 24. FIG. 6 is a conceptual diagram showing the information stored in the title data table 24. As shown in FIG. 6, the association relation among the user identifier, the title identifier, the title name, the input style and the public/nonpublic is stored in the title data table 24. Thus, a title data group transmitted from the multiple user terminals 2 is accumulated in the title data table 24.

Step S4; Generation of Title Compilation Data

In the server device 3, the title compilation part 21 refers to the title data table 24, and counts the number of users (number of creation users) who created the title data for each title name. The title compilation part 21 counts the number of creation users in accordance with a prescribed condition (e.g., once a day). Then, the title compilation part 21 generates title compilation data that indicates an association relation between the title name and the number of the creation users. The title compilation part 21 stores the title compilation data in the title compilation table 23. FIG. 7A is a conceptual diagram showing the title compilation table 23. In an example shown in FIG. 7A, it is indicated that the number of the users who created data corresponding to "weight" with a "ten-key style" is "153". Similarly, it is indicated that the number of the users who created data corresponding to "tobacco" with a "count style" is "124".

[Reference to Title]

Figure 2B:
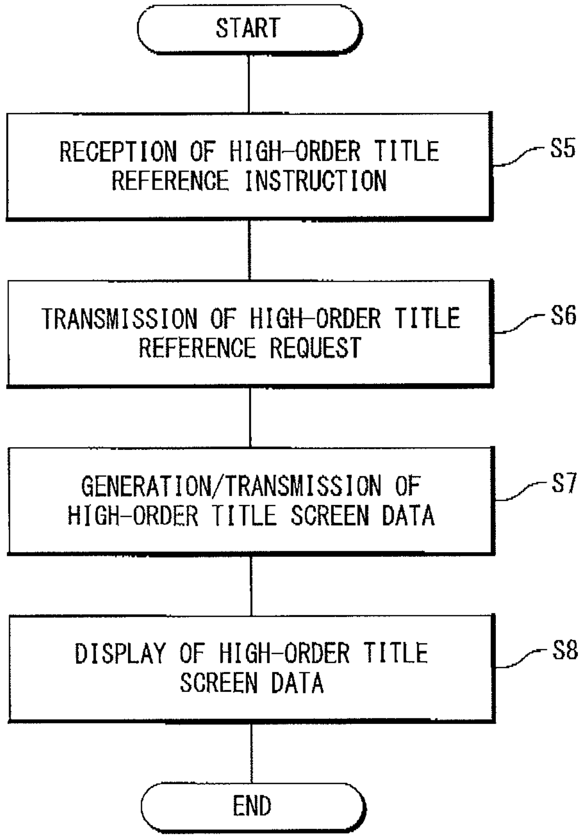
FIG. 2B is a flow chart showing an operation when a high-order title reference button is selected.

In the numerical value management system 1 according to the present embodiment, the user can know a title name of the management data that is created by the other users. An operation method in this case will be described below. FIG. 2B is a flow chart showing an operation in a case where the high-order title reference button 29 (see FIG. 3) is selected. Also, the data flow in this case is shown in FIG. 1.

Step S5; Reception of High-Order Title Reference Instruction

If it is desired to know what management data is created by the other users, the user selects the high-order title reference button 29 shown in the initial screen (see FIG. 3) with using the input part 7. The high-order title reference part 16 receives a high-order title reference instruction from the input part 7.

Step S6; Transmission of High-Order Title Reference Request

When receiving the high-order title reference instruction, the high-order title reference part 16 generates a high-order title reference request. The high-order title reference request is transmitted to the server device 3 via the communication part 10.

Step S7; Generation/Transmission of High-Order Title Screen Data

In the server device 3, the page generation part 22 obtains the high-order title reference request, via the communication part 12. When obtaining the high-order title reference request, the page generation part 22 references the title compilation table 23 (see FIG. 7A). Then, the page generation part 22 extracts a "title name" of a high-order in the number of creation users in accordance with a predetermined standard. As an example of the standard, for example, a high-ranking within tenth place, the number of creation users being 100 or more, and the like can be used. Here, in the title compilation data table 23, there may be a case where there exists data of different input styles but having the same title name. In such a case, the title names may be extracted independently of the input styles or may be individually extracted for each input style. Then, the page generation part 22 generates high-order title screen data indicating the extracted title names. FIG. 7B is a conceptual diagram showing the high-order title screen data. In the example shown in FIG. 7B, an association relation among a ranking, the title name and the number of creation users is shown as the high-order title screen data. The title names are listed in accordance with the order of the ranking.

The page generation part 22 sends the generated high-order title screen data to the user terminal 2 via the communication part 12.

Step S8; Display of High-Order Title Screen Data

In the user terminal 2, the high-order title reference part 16 obtains the high-order title screen data via the communication part 10. The high-order title reference part 16 displays the high-order title screen data on the display screen of the display part 6.

By the operation method mentioned above, the user can confirm the displayed high-order title screen data and know what management data is created by the other users. Thus, when newly creating the management data, the user can know the title name of the management data created by the other users, and it is facilitated for the user to decide what management data should be created.

[Input of Numerical Data]

Figure 8:
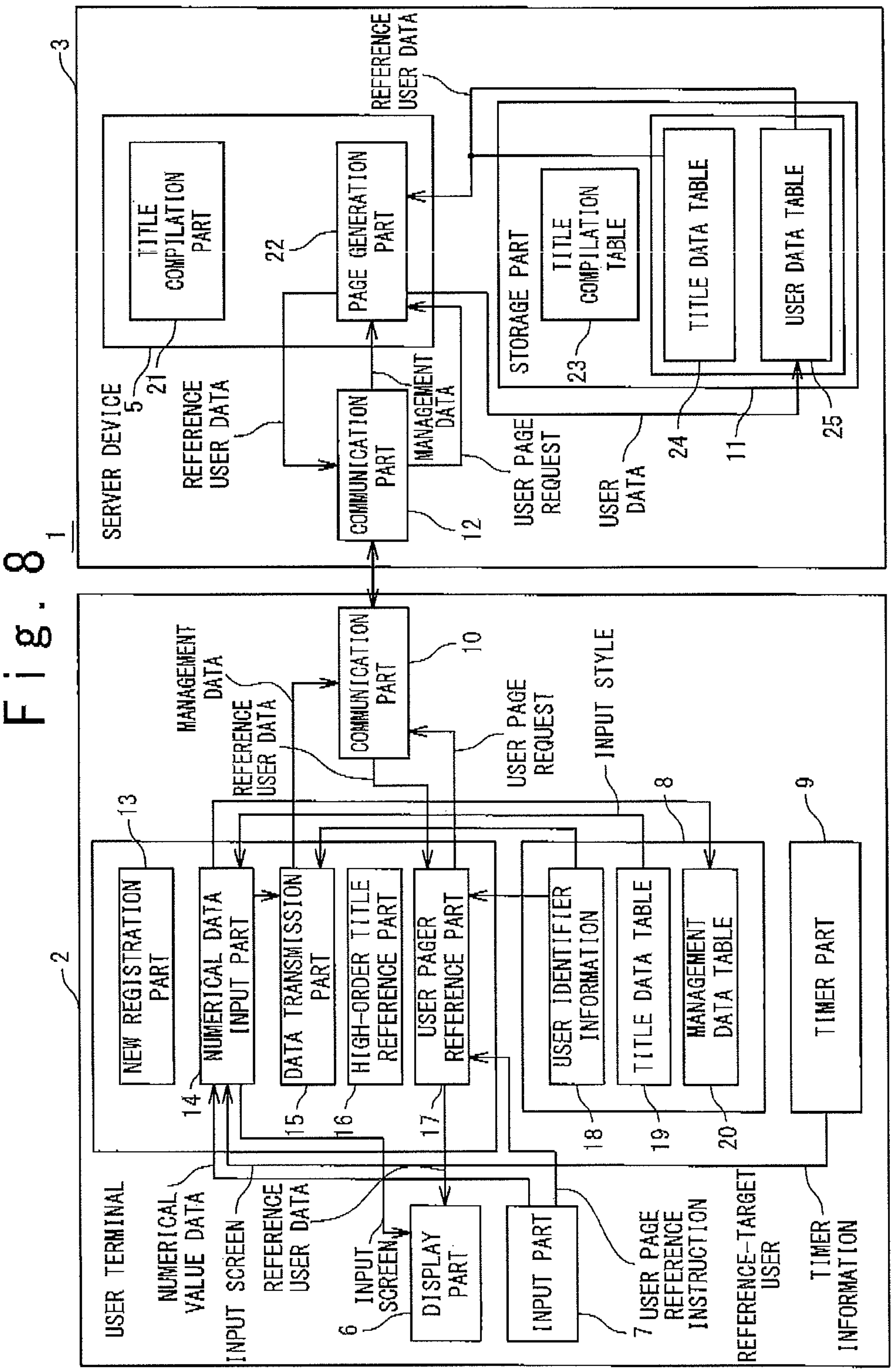
FIG. 8 is a block diagram showing a data flow when numerical data is inputted.
Figure 9A:
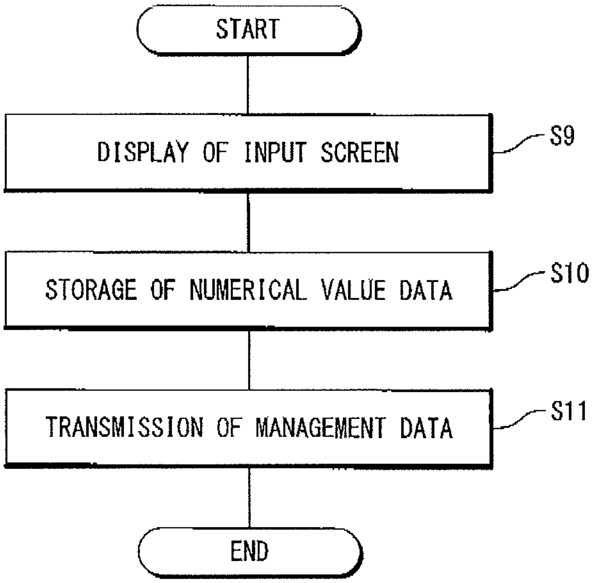
FIG. 9A is a flow chart showing an operation method when the numerical data is inputted.

Subsequently, an operation in a case of inputting numerical data will be described below. FIG. 8 is a block diagram showing a data flow in the case of inputting the numerical data. FIG. 9A is a flow chart showing an operation method in the case of inputting the numerical data.

Step S9; Display of Input Screen

When inputting the numerical data of the management data, the user selects the title name designation button 27 in the initial screen (see FIG. 3). When the title name designation button 27 is selected, the numerical data input part 14 displays an input screen corresponding to the selected title name on the display part 6. In this operation, the numerical data input part 14 refers to the title data table 19 (see FIG. 5), discriminates an input style corresponding to the selected title, and displays an input screen corresponding to the discriminated input style.

Figure 9B:
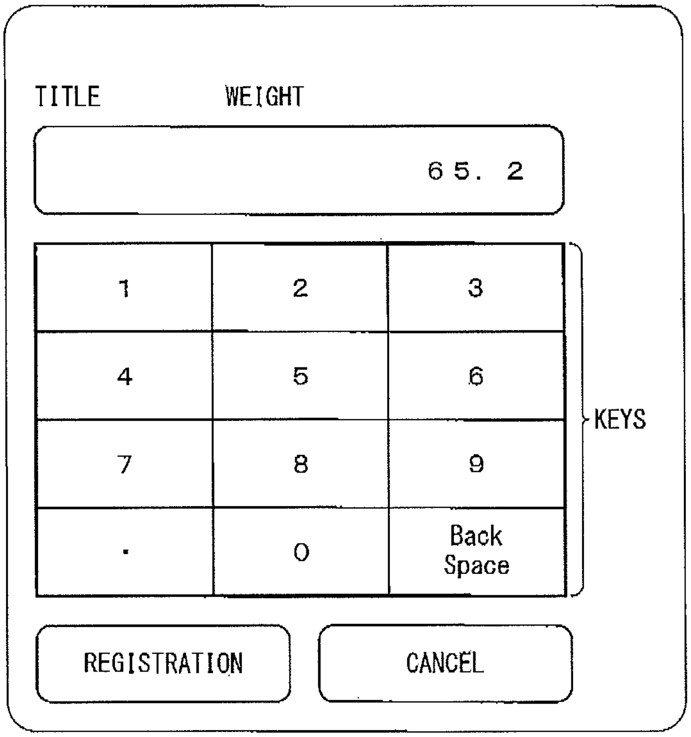
FIG. 9B is a diagram showing an example of an input screen corresponding to a ten-key style.

FIG. 9B is a diagram showing an example of an input screen corresponding to the ten-key style. In the input screen corresponding to the ten-key style, a title name, an input numeral display column, a plurality of key associated with different numerals, and a registration button are shown. The user can designate a numerical value by selecting the plurality of key. In the example shown in FIG. 9B, "weight" is selected as the title name. In the input numeral display column, "65.2"

is designated as the numerical value. When the user selects the registration button, the numerical value shown in the input numeral display column is inputted into the user terminal 2 as the numerical data.

Figure 9C:
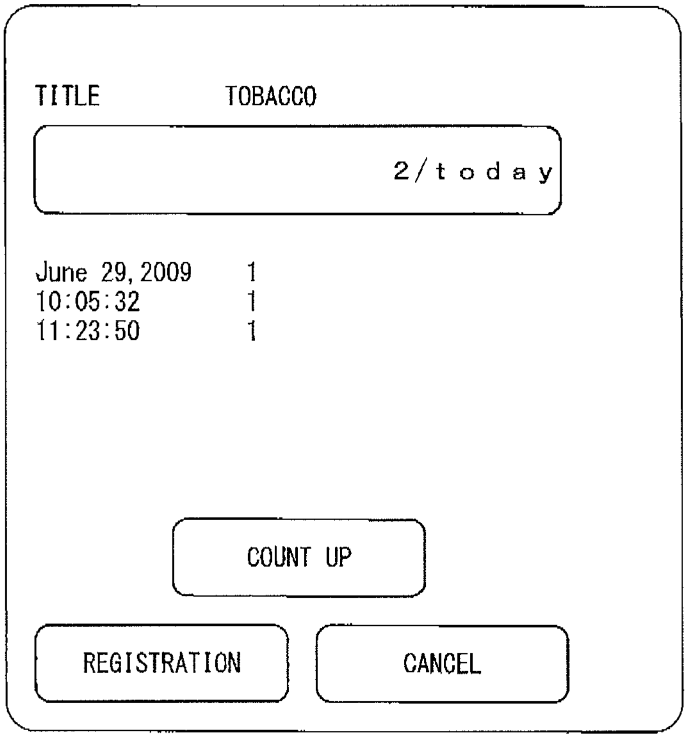
FIG. 9C is a diagram showing an example of an input screen corresponding to a count style.

FIG. 9C is a diagram showing an example of an input screen corresponding to the count style. In the input screen corresponding to the count style, a title name, an input numeral display column, a count-up key (count key), and a registration button are shown. In the example shown in FIG. 9C, "tobacco" is selected as the title name. Also, "2/today" is displayed on the input numeral display column. When the user selects the count-up key, the numerical value shown in the input numeral display column is incremented. Therefore, the numerical value can be designated by selection times of the count-up key. When the user selects the registration button, the numerical value shown in the input numeral display column is inputted into the user terminal 2 as the numerical data.

By using the numerical value management system 1 according to the present embodiment, the user can create management data of various title names. Herein, there may be a case where preferable input styles are different according to a target to be managed. That is, there may be a case where the ten-key style is preferable or a case where the count style is preferable. For example, in a case where the target to be managed is a weight, the ten-key style is more useful than the count style. Whereas, in a case where the target to be managed is the number of tobaccos puffed on the day, the count style is more useful than the ten-key style. According to the present embodiment, since the user can select the input style, an optimum input style can be used in accordance with the target to be managed. It is noted that, although the count style and the ten-key style are exemplified as the input style in the present embodiment, the other input styles may be selectable.

Step S10; Storage of Numerical Data

When the registration button is selected at Step S9, the input part 7 notifies the numerical data to the numerical data input part 14. When acquiring the numerical data, the numerical data input part 14 acquires time information from the timer part 9. The numerical data input part 14 associates the numerical data with a title identifier corresponding to the title name and the time information, and stores the resultant data in the management data table 20 as the management data. FIG. 10 is a conceptual diagram showing the information stored in the management data table 20. As shown in FIG. 10, an association relation among the title identifier, the numerical data and the time (date and time) is described in the management data table 20. Herein, since the title identifier is associated with the title name in the title data table 19 (see FIG. 5), the numerical data is substantially associated with the title name.

Step S11; Transmission of Management Data

When "public/nonpublic" is set to "public" in the stored management data, the data transmission part 15 acquires the management data from the numerical data input part 14. The data transmission part 15 acquires the user identifier information 18 and adds the user identifier to the management data, and the resultant management data is transmitted to the server device 3 via the communication part 10. In the server device 3, the page generation part 22 acquires the management data via the communication part 12. The page generation part 22 associates the user identifier with the management data, and stores the resultant data in the user data table 25 as user data. FIG. 11 is a conceptual diagram showing contents of the user data table 25. As shown in FIG. 11, an association relation among the user identifier, the title identifier, the numerical data and the time information (date and time) is stored in the user data table 25.

By the operations up to Step S11 described above, the numerical data of the management data is inputted into the numerical value management system 1.

[Reference to User Page]

Figure 12:
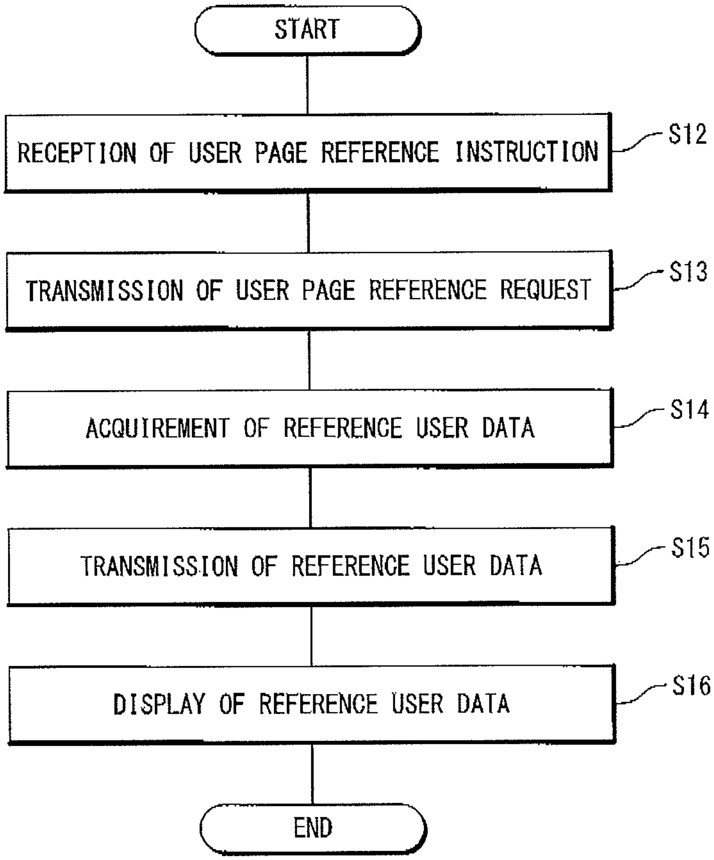
FIG. 12 is a flow chart showing an operating method when a user page is referenced.

In the numerical value management system 1 according to the present embodiment, management data of a specified user can be referenced by using each user terminals 2. An operation method in a case of referencing the management data of a specified user will be described below. The data flow in this case is shown in FIG. 8. Also, FIG. 12 is a flow chart showing the operation method in this case.

Step S12; Reception of User Page Reference Instruction

When it is desired to reference the management data of a specified user, the user selects the user page reference button 30 in the initial screen (see FIG. 3). Then, the user page reference part 17 receives user page reference instruction from the input part 7. The user page reference part 17 displays a screen (not shown) on the display part 6 to urge to input information (such as URL etc.) that specifies a user (reference-target user) to be referenced.

Step S13; Transmission of User Page Request

When the user inputs the information specifying a reference-target user, the user page reference part 17 generates a user page request including the inputted information specifying the reference-target user. The user page request is transmitted to the server device 3 via the communication part 10.

Step S14; Acquirement of Reference User Data

Figure 13:
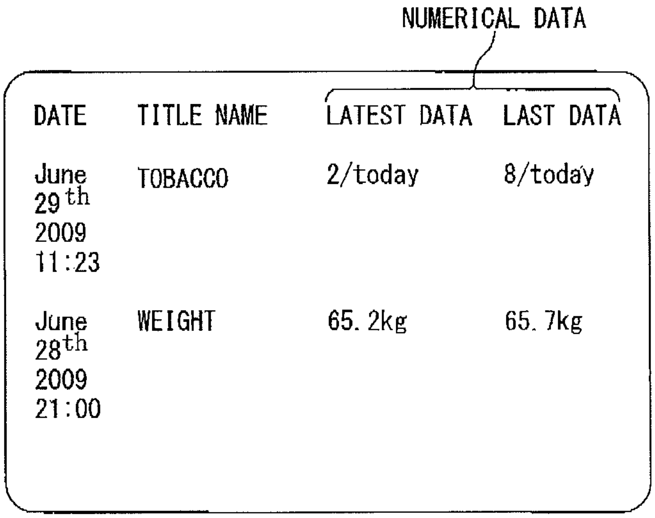
FIG. 13 is a conceptual diagram showing reference user data.

In the server device 3, the page generation part 22 acquires the user page request. The page generation part 22 acquires a user identifier corresponding to the reference-target user based on the user page request, refers to the title data table 24 and the user data table 25, and acquires user data and title data which correspond to the reference-target user as reference user data. Herein, the association relation between the information specifying a user and the user identifier may be previously stored in the storage part 11 and the like. FIG. 13 is a conceptual diagram showing the reference user data. In the example shown in FIG. 13, the reference user data indicates time information (date), a title name and numerical data (latest data and last data).

Step S15; Transmission of Reference User Data

The page generation part 22 sends the reference user data to the user terminal 2 via the communication part 12.

Step S16; Display of Reference User Data

In the user terminal 2, the user page reference part 17 acquires the reference user data. The user page reference part 17 displays the reference user data on the display part 6.

By the operations up to Step S16 described above, the user can know what management data is created by the other users. Additionally, the user can know the contents (numerical data) of the management data. In a case where the user creates management data of a title name same as that of other users, the user can compare user's own numerical data with the numerical data of the other users, by referencing the numerical data included in the management data of other users. Thus, the user can continuously input the numerical data with higher motivation.

Also, at Step S13, if the user inputs information specifying himself as the reference-target user, the user can know contents of the management data under user's own management.

Also, regarding the reference user data shown in FIG. 13, two pieces of data (latest data and last data) are used as the numerical data associated with one title name. Since the number of data to be used as the numerical data is limited to two, the number of the numerical data stored in the user data table 25 can be limited. Thus, a storage capacity required for the user data table 25 can be reduced. It is noted here that the number of the numerical data of the reference user data is not always limited to two.

Moreover, in the present embodiment, only in the case where the public/nonpublic is set to “public”, the numerical data inputted into the user terminal 2 is transmitted to the server device 3. However, the numerical data may be transmitted to the server device 3 to be stored independently of the public or nonpublic. At Step S14 (acquirement of reference user data) as already discussed, the page generation part 22 may extract only the data set to “public” to generate the reference user data.

[Copy of Title Data of Other Users]

Figure 14:
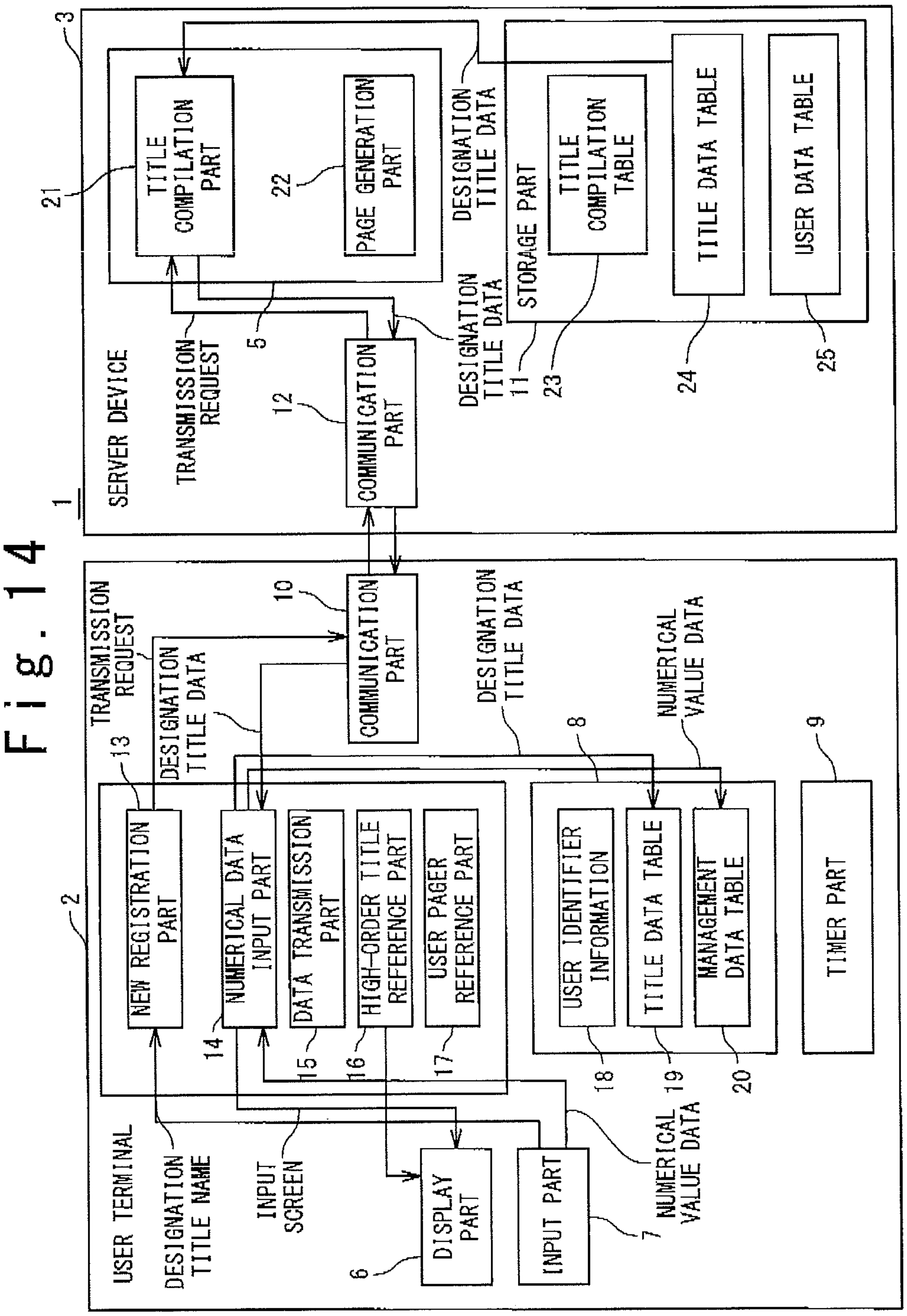
FIG. 14 is a block diagram showing a data flow when management data is created utilizing title data created by other user.
Figure 15:
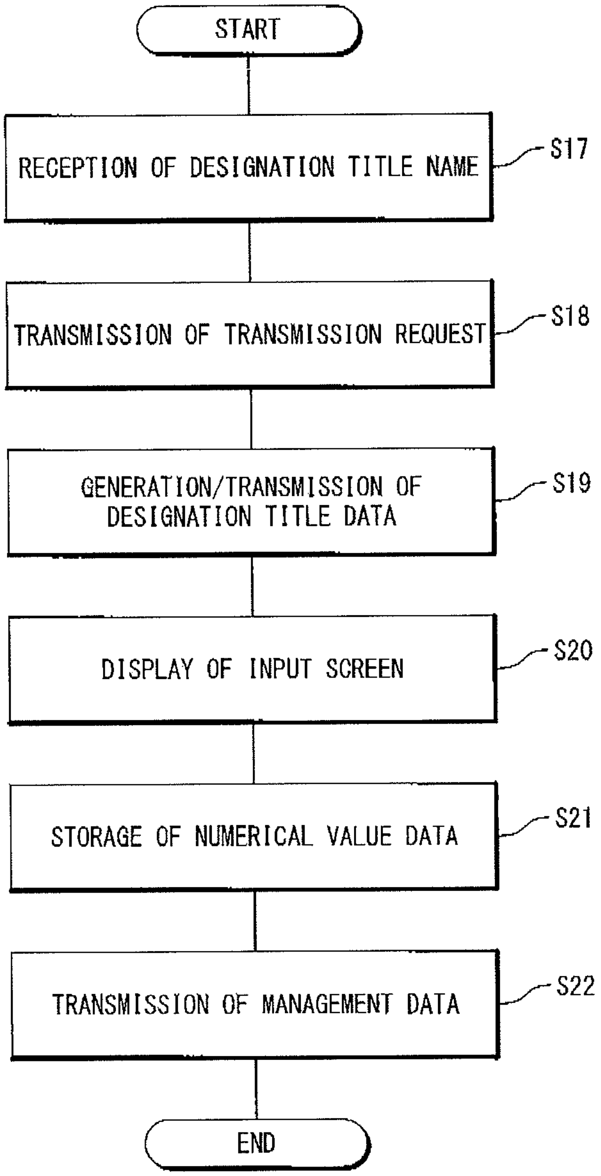
FIG. 15 is a flow chart showing an operation method when management data is created utilizing title data created by other user.

In the numerical value management system 1 according to the present embodiment, management data may be newly created, by copying the title data that is created by other users. FIG. 14 is a block diagram showing a data flow when management data is created by using the title data of other users. FIG. 15 is a flow chart showing an operating method when the management data is created by using the title data of other users.

Step S17; Reception of Designation Title Name

After the high-order title screen data (see FIG. 7B) is displayed on the display part 6 in Step S8, it is assumed that the user designates a title name to be, created with using the input part 7. The new registration part 13 receives the designated title name as a designation title name from the input part 7.

Step S18; Transmission of Transmission Request

The new registration part 13 generates a transmission request showing the designation title name, and sends the transmission request to the server device 3 via the communication part 10.

Step S19; Generation/Transmission of Designation Title Data

In the server device 3, the title compilation part 21 acquires the transmission request via the communication part 12. The title compilation part 21 refers to the title data table 24, and acquires the title data corresponding to the designation title name as designation title data. The title compilation part 21 sends the designation title data to the user terminal 2 via the communication part 12.

Step S20; Display of Input Screen

In the user terminal 2, the numerical data input part 14 acquires the designation title data. The numerical data input part 14 stores the designation title data in the title data table 19 as new title data. Further, the new registration part 13 adds user identifier information to the new title data to transmit to the server device 3. In addition, the numerical data input part 14 generates input screen data corresponding to the new title data to display on the display part 6, similarly to the process in Step S8 as already discussed.

Thereafter, the numerical data (Step S21) is stored similarly to the operation in Step S10 as already discussed. Also, new management data is transmitted (Step S22), similarly to the operation in Step S11 as already discussed.

According to the operation method described above, by selecting the title name in the high-order title screen data, the designation title data is automatically stored in the title data table of the user terminal 2. That is, the title data created by other users is copied. Therefore, when new management data is created, it is not necessary for the user to enter information indicating such as a title name and the input style etc. It becomes possible to easily create the management data.

It is noted that, in the present embodiment, the case was explained where the title data table 19 and the management data table 20 are stored in each user terminal 2. However, it is not always necessary to store the title data table 19 and the management data table 20 in each user terminal 2, and these tables 19 and 20 may be stored in the server device 3. In this case, the title data table 19 and the management data table 20 are prepared for every user identifier in the server device 3. The new registration part 13 and the numerical data input part 14 etc. sends the storage data (title data, numerical data etc.) together with the user identifiers to the server device 3 and stores the same in the title data table 19 and the management data table 20 correspondingly.

Second Embodiment

Figure 16:
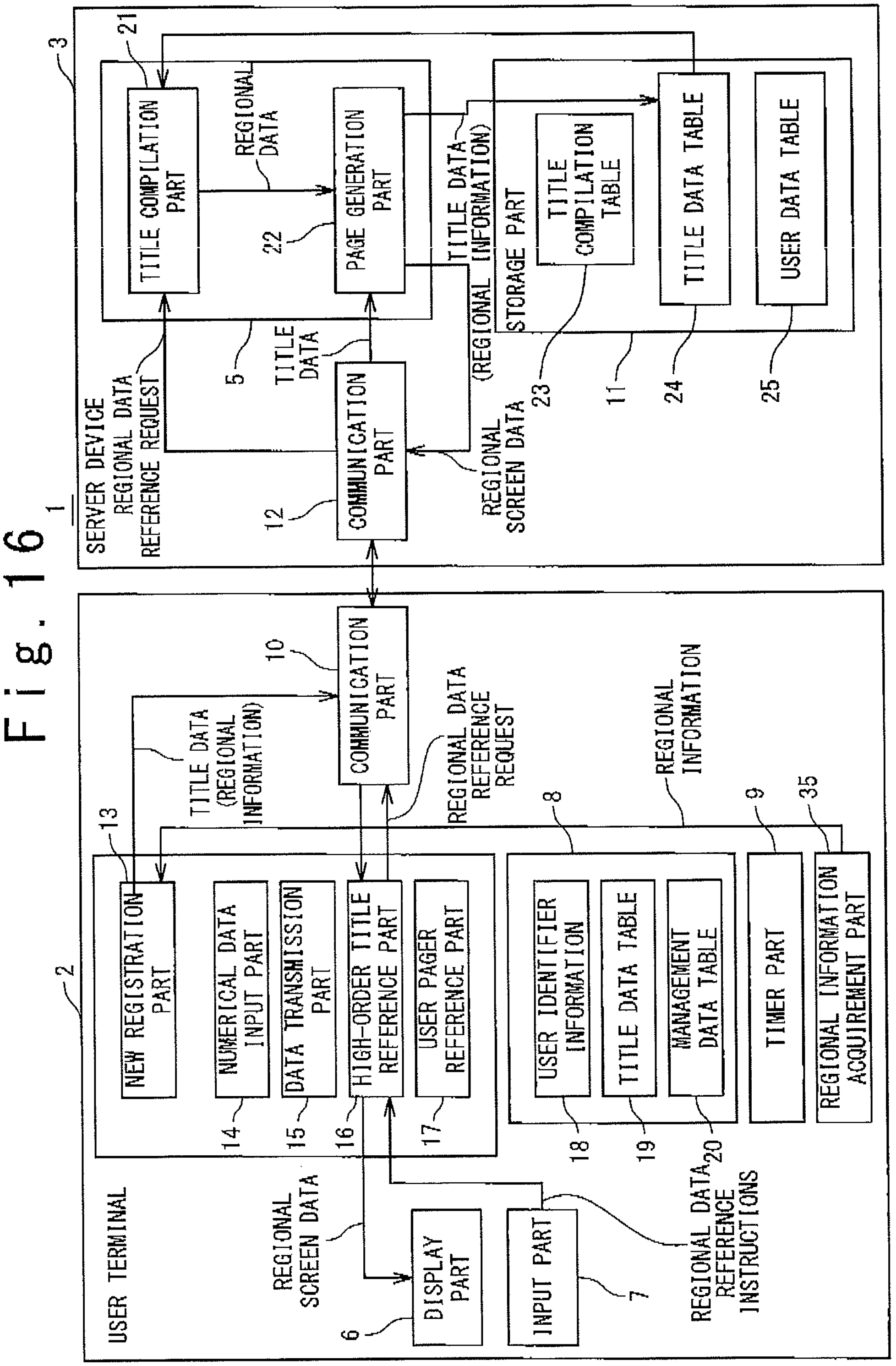
FIG. 16 is a block diagram showing a numerical value management system according to a second embodiment.

Next, a second embodiment will be described below. FIG. 16 is a block diagram showing a numerical value management system 1 according to the present embodiment. In the present embodiment, a regional information acquirement part 35 is added in the user terminal 2. Since the other, parts can be similar to those in the first embodiment, the detailed explanation thereof will be omitted.

The regional information acquirement part 35 has a function of acquiring regional information (for example, time zone information) that indicates a current position of the user terminal 2.

Figure 17:
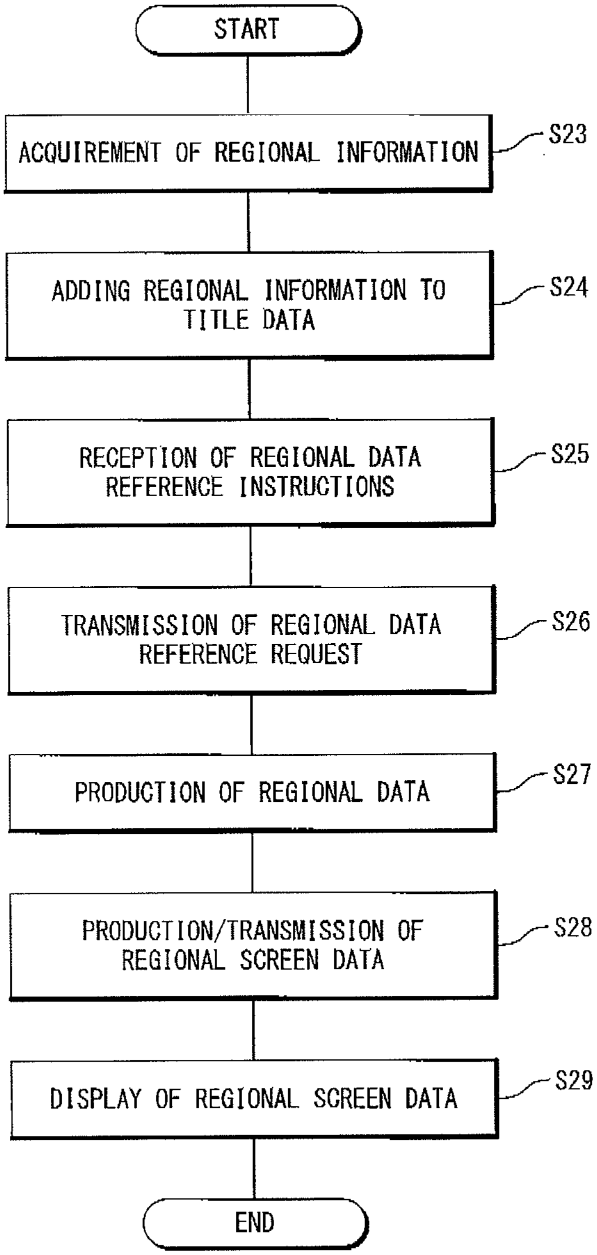
FIG. 17 is a flow chart showing an operating method of the numerical value management system according to the second embodiment.

FIG. 17 is a flow chart showing an operation method of the numerical value management system 1 according to the present embodiment.

Step S23: Acquirement of Regional Information

In the present embodiment, the new registration part 13 acquires regional information from the regional information acquirement part 35.

Step S24: Adding Regional Information to Title Data

When the title data is transmitted to the server device 3, the new registration part 13 adds the regional information to the title data and sends the same to the server device 3. In the server device 3, the page generation part 22 acquires the title data added with the regional information and stores the same in the title data table 24. That is, in the present embodiment, the regional information is also stored in the title data table 24.

Step S25: Reception of Regional Data Reference Instructions

It is assumed that a user inputs a title name and a regional data reference instruction into the user terminal 2 with using the input part 7. Then, the high-order title reference part 16 receives the regional data reference instruction.

Step S26: Transmission of Regional Data Reference Request

The high-order title reference part 16 generates a regional data reference request including the inputted title name. The regional data reference request is transmitted to the server device 3 via the communication part 10.

Step S27: Generation of Regional Data

In the server device 3, the title compilation part 21 acquires the regional data reference request. The title compilation part 21 references the title data table 24 and counts the number of creation users corresponding to the inputted title name for every region, and generates regional data indicating the counting results.

Step S28: Generation/Transmission of Regional Screen Data

Figure 18:
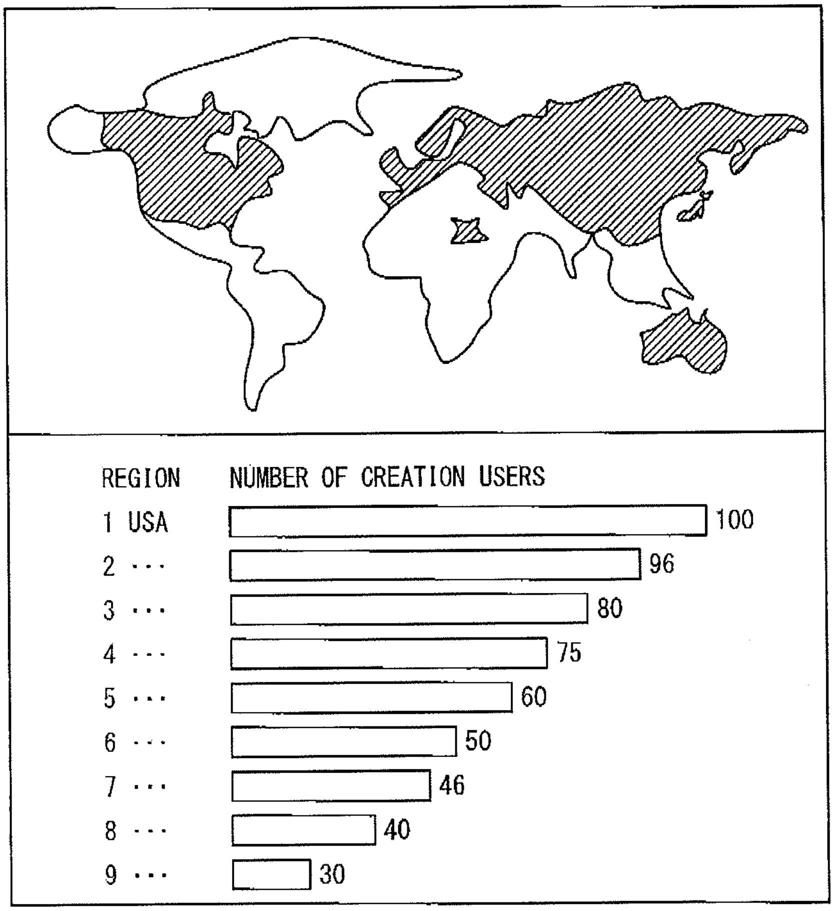
FIG. 18 is a diagram showing an example of regional screen data.

Subsequently, the page generation part 22 generates regional screen data based on the regional data. FIG. 18 is a diagram showing one example of the regional screen data. As shown in FIG. 18, the regional screen data indicates the number of creation users for every region. The regional screen data is transmitted to the user terminal 2 via the communication part 12.

Step S29: Display of Regional Screen Data

In the user terminal 2, the high-order title reference part 16 acquires the regional screen data. The high-order title reference part 16 displays the regional screen data on the display part 6.

As described above, according to the present embodiment, the user can know the number of creation users for every region. By using information including the regional information as the title data, it becomes possible for the user to know the information in more details.

Third Embodiment

Figure 19:
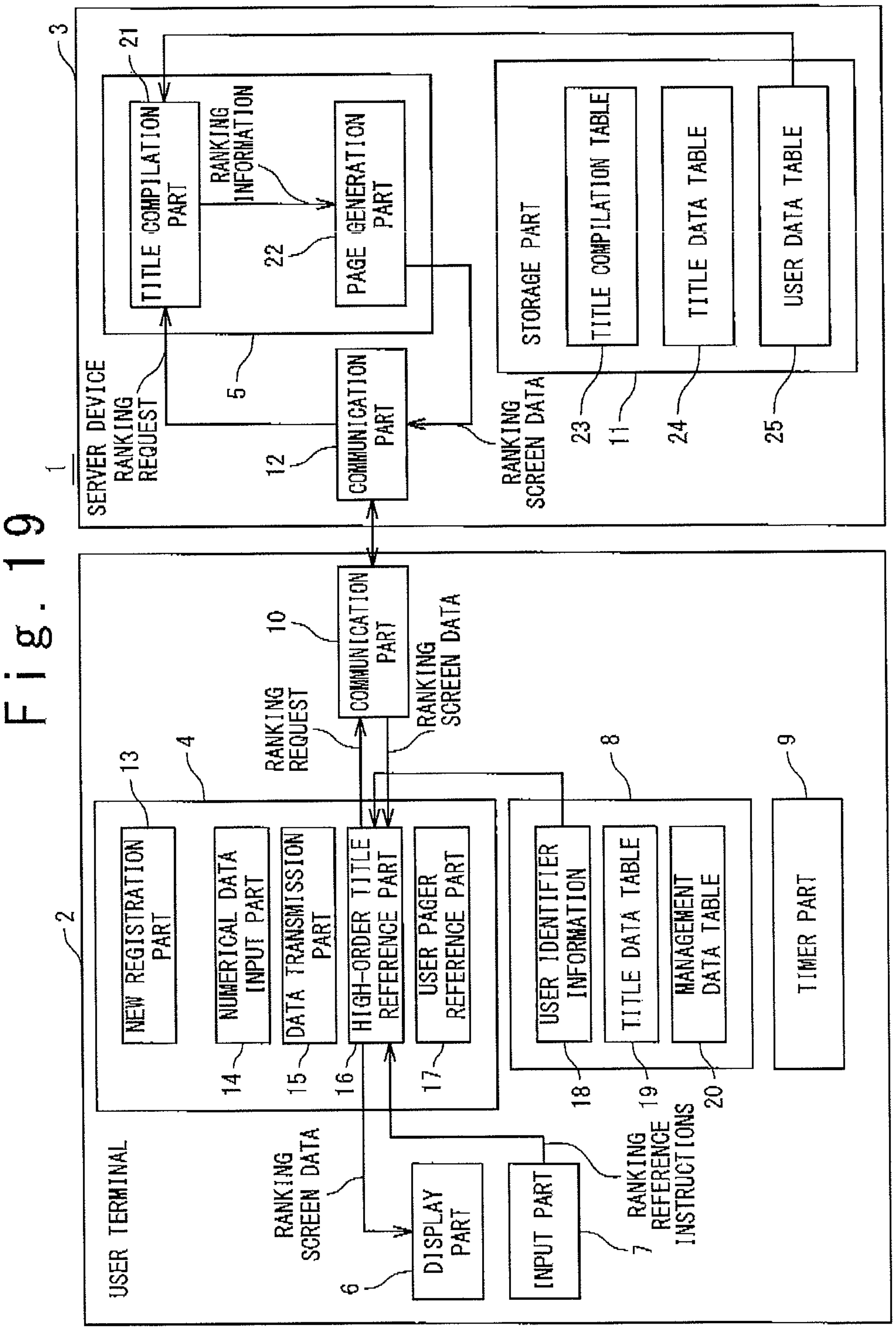
FIG. 19 is a block diagram showing a data flow in a numerical value management system according to a third embodiment.
Figure 20:
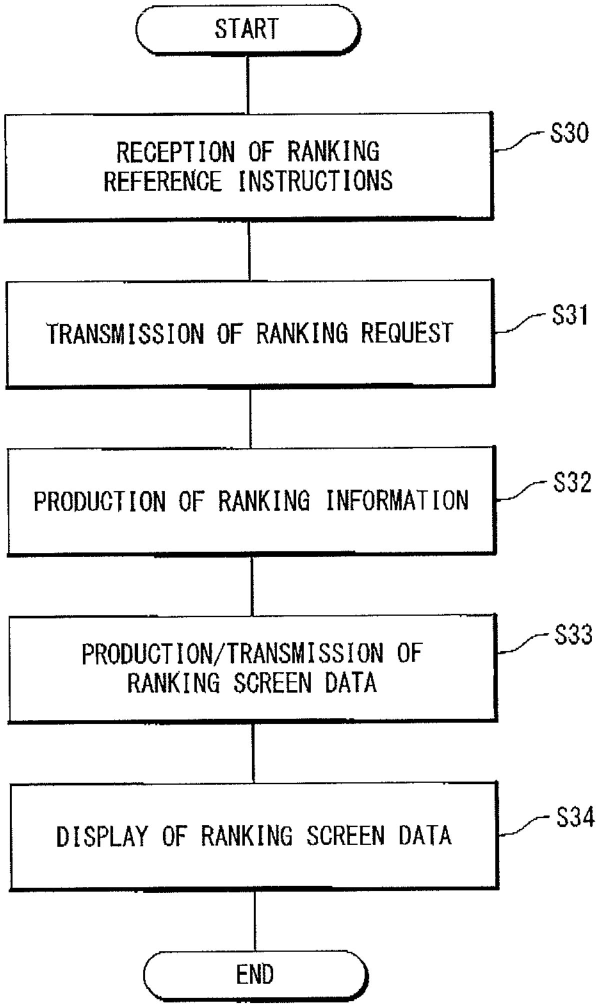
FIG. 20 is a flow chart showing an operation method of the numerical value management system according to the third embodiment.

Next, a third embodiment will be described below. In the numerical value management system 1 according to the present embodiment, the high-order title reference part 16 has a function of displaying ranking screen data. The ranking screen data indicates a rank of numerical data included in the user's management data. Since the other points can be same as those of the embodiments mentioned above, the detailed explanation thereof will be omitted. FIG. 19 is a block diagram showing a data flow in the numerical value management system 1 according to the present embodiment. FIG. 20 is a flow chart showing an operation method of the numerical value management system according to the present embodiment.

Step S30: Reception of Ranking Reference Instruction

It is assumed that the user designates a title name and inputs a ranking reference instruction through the input part 7. The high-order title reference part 16 receives the ranking reference instruction.

Step S31: Transmission of Ranking Request

When receiving the ranking reference instruction, the high-order title reference part 16 generates a ranking request. Further, the high-order title reference part 16 acquires user identifier information, with referring to the storage part 8. The high-order title reference part 16 adds the designated title name and the user identifier information to the ranking request and sends the same to the server device 3 via the communication part 10.

Step S32: Generation of Ranking Information

In the server device 3, the title compilation part 21 acquires the ranking request via the communication part 12. The title compilation part 21 references the user data table 25, and calculates the ranking of the user about the designated title name. Then, the title compilation part 21 generates ranking information indicating the calculation result and notifies the same to the page generation part 22.

Step S33: Generation/Transmission of Ranking Screen Data

Figure 21:
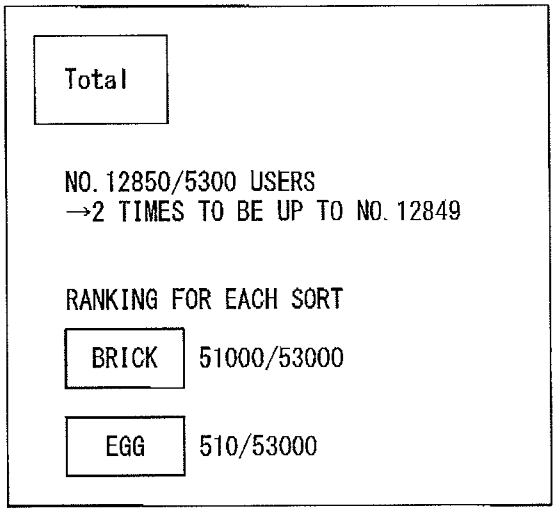
FIG. 21 is a diagram showing an example of ranking screen data.

The page generation part 22 generates ranking screen data based on the ranking information. FIG. 21 is a diagram shown an example of the ranking screen data. In the example shown in FIG. 21, it is indicated that the ranking of the user is determined No. 12850 of 53000 users. As shown in FIG. 21, other information such as information needed for one rank up may be shown in the ranking screen data. The ranking screen data is transmitted to the user terminal 2 via the communication part 12.

Step S34: Display of Ranking Screen Data

In the user terminal 2, the high-order title reference part 16 acquires the ranking screen data via the Communication part 10. The high-order title reference part 16 displays the ranking screen data on the display part 6.

According to the present embodiment, the user can know user's own ranking by referencing the ranking screen data displayed on the display part 6. Thus, a motivation can be improved at a time of managing the numerical data and it is possible to urge the user to continuously manage the numerical value.

Modified Example of Third Embodiment

By using the numerical value management system 1 according to the third embodiment, a number of times of repetitive exercises, for example, pushups, web reinforcements, strengths in back and the like can be also managed. In the present modified example, the numerical data management system 1 will be explained, which can manage the number of exercise times of the repetitive exercises. In the present modified example, the operation of the numerical data input part 14 is devised. Further, title data for managing the repetitive exercise is previously described in the title data tables 19 and 24. FIG. 22 is a conceptual diagram showing the contents of the title data table 19 in the present modified example. As shown in FIG. 22, the title data for managing the repetitive exercise is previously stored in the title data table 19. In the title data for managing of repetitive exercise, the title name is set to "repetitive exercise (push-ups)", the input style is set to "count style", and the public/nonpublic is set to "public". Although not shown in the drawings, the title data for managing the repetitive exercise is previously stored in the title data table 24, similarly.

In the present modified example, the user inputs an action of executing the management of the repetitive exercise into the user terminal 2. Then, the numerical data input part 14 references the title data table 19, and displays an input screen with the count style in accordance with the title data for managing repetitive exercise. Herein, the display part 6 and the input part 7 are constructed in a touch panel style as already discussed. The numerical data input part 14 displays an image of an object (for example, brick, tile and egg etc.) in the input region of the input screen. Upon execution of the repetitive exercise, the user pushes up and down the input region where the object is displayed. For example, when push-ups are executed as the repetitive exercise, the user pushes down the input region by user's jaw. When the input region is pushed down, the numerical data input part changes the image displayed on the input region to an image showing a broken object. By changing the image like this, the user can continue the repetitive exercise and the like with enjoyment. The numerical data input part 14 counts the number of times of the pushing down the input region, and the counted value is stored in the storage part 8 as the numerical data, similarly to the embodiments as already discussed. Then, the numerical data is transmitted to the server device 3.

The operations thereafter are same as in the third embodiment. That is, the user can reference the ranking screen data concerning the repetitive exercise, if necessary, and can know the rank of the number of repetitive exercise times executed by himself.

Fourth Embodiment

Figure 23:
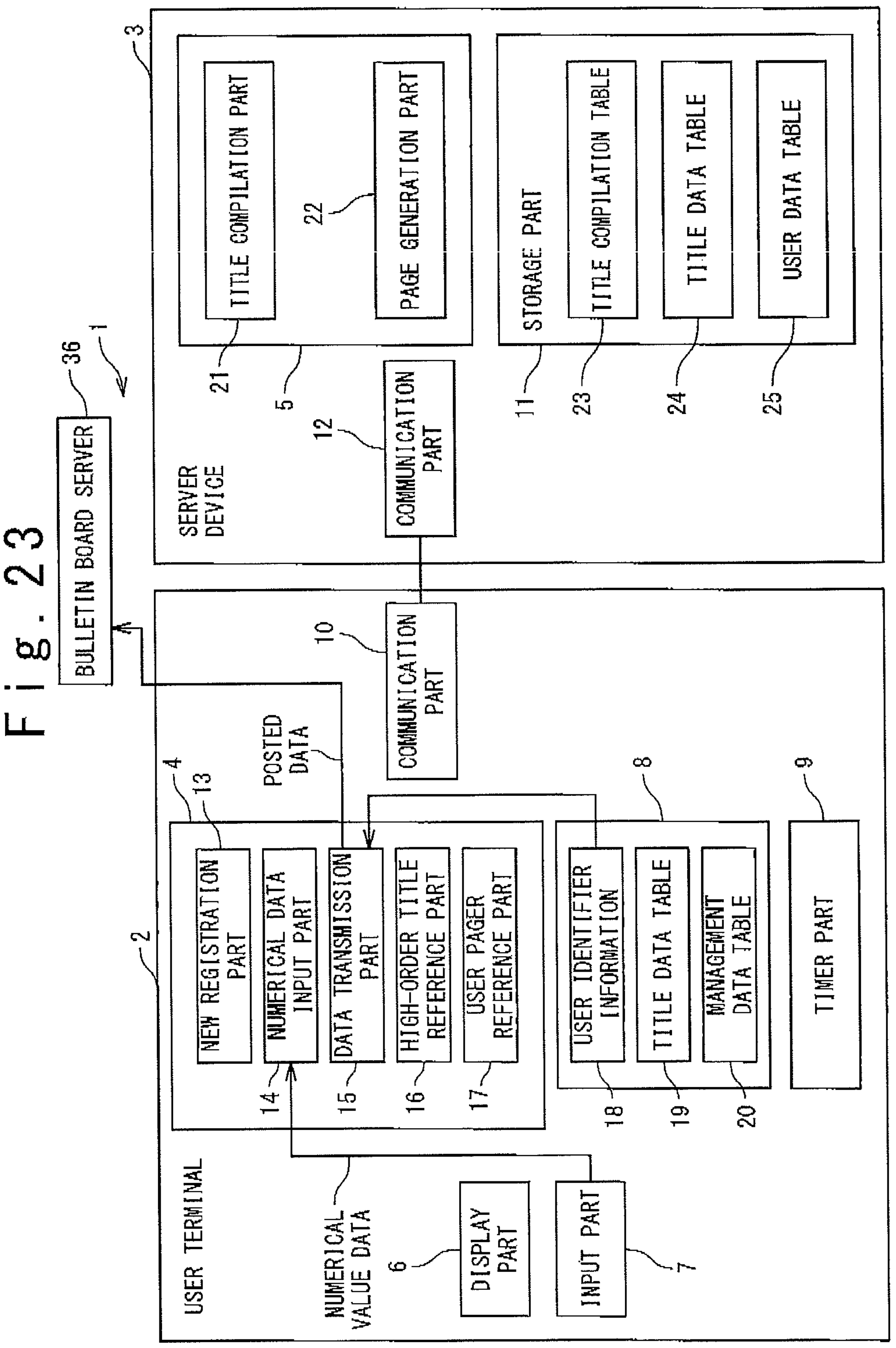
FIG. 23 is a block diagram showing a numerical value management system according to a fourth embodiment.

Next, a fourth embodiment is described below. FIG. 23 is a block diagram showing a numerical value management system 1 according to the present embodiment. In the numerical value management system 1 according to the present embodiment, the user terminal 2 is connected to a bulletin board server 36 via a network. Also, in the present embodiment, information indicating public/nonpublic on a bulletin board is created as title data. Since the other points are same as those of the embodiments mentioned above, the detailed explanation thereof will be omitted.

In the present embodiment, when the user inputs numerical data by using the input part 7, the numerical data input part 14 acquires the numerical data. Then, the numerical data is transmitted to the data transmission part 15. The data transmission part 15 collects necessary information (title name, user identifier and URL of user terminal 2) in preparation for sending the same to the bulletin board server 36. The information may be stored in the storage part of the user terminal 2. The data transmission part 15 adds the collected information to the numerical data and the resultant data is transmitted to the bulletin board server 36 as posted data.

The bulletin board server 36 manages the posted data and the collected posted data is opened to public in response to a request from the other user terminal 2. As the bulletin board server 36, there is available a server for use in, for example, "twitter (i.e., a service name of twitter corporation)".

According to the present embodiment, the contents of the management data managed in the numerical value management system 1 can be automatically posted to a bulletin board service.

With the above discussion, the present invention is described with using the first to fourth embodiments. These embodiments should not be interpreted as being independent from each other but may be combined within a scope without a contradiction.

What is claimed is:

1. A numerical value management system, comprising:

a server device comprising a title compiling part and a page generation part; and a plurality of user terminals, each of which is accessibly connected with said server device and comprises a new registration part and a title reference part, wherein each of said plurality of user terminals further comprises a numerical data input part and a storage part, wherein said new registration part is configured to generate title data including a title name of management data and an input style, and to store said title data in said storage part, and to send said title data to said server device, when said title name and said input style are inputted into each of said plurality of user terminals, wherein said numerical data input part is configured to display an input screen corresponding to said title name and said input style on a display screen, and to store inputted numerical data as said management data to said storage part, wherein said title compiling part is configured to count a number of users who create said title data for each title name and for each input style based on title data group that is obtained from said plurality of user terminals to generate title compilation data that indicates a relationship between said title name and a number of creating users, wherein said title reference part is configured to send a high-order title reference request to said server device, wherein said page generation part is configured to generate high-order title screen data indicating title names in descending order of said number of creating users based on said title compilation data, and to send said high-order title screen data to said each user terminal when said server device obtains said high-order title reference request, wherein said title reference part is configured to display said high-order title screen data on said display screen, wherein when a title name shown in said high-order title screen data is designated by a user as a designated title name, said new registration part sends a transmission request indicating said designated title name to said server device, wherein when said title compiling part receives said transmission request, said title compiling part sends designated title data corresponding to said designated title name to said each user terminal, wherein said numerical data input part stores said title data from said title compiling part of said server device in said storage part, and wherein said new registration part sends said title data stored in said storage part to said server device.

2. The numerical value management system according to claim 1, wherein when a numerical value corresponding to said title name is inputted into said each user terminal, said numerical value input part associates said title name with said inputted numerical value to store as said management data.

3. The numerical value management system according to claim 2, wherein said numerical value input part is configured to send said management data to said server device, and said management data is stored in said server device.

4. The numerical value management system according to claim 2, wherein when said each user terminal receives said designated title data, said new registration part generates new title data based on said designated title data.

5. The numerical value management system according to claim 4, wherein said new registration part stores said title data in said each user terminal.

6. The numerical value management system according to claim 4, wherein said new registration part sends said new title data to said server device to store in said server device.

7. The numerical value management system according to claim 2, wherein said new registration part displays input style designation information on said display screen to prompts a user to designate an input style for inputting numerical value, wherein when said input style is designated, said new registration part generates data indicating a relationship between said title name and said designated input style as said title data, and wherein said numerical data input part refers to said title data and displays a screen for inputting said numerical value on said display screen with said designated input style.

8. The numerical value management system according to claim 7, wherein said new registration part displays said input style designation information such that said input style is designated from a style group that includes a ten-key style and a count style, wherein when said ten-key style is designated as said input style, said numerical data input part recognizes a numerical value by specifying a pushed key from a plurality of keys corresponding to different numbers, and wherein when said count style is designated as said input style, said numerical data input part recognizes a numerical value by specifying a selection times of a count key.

9. The numerical value management system according to claim 2, wherein said each user terminal further comprises a user page reference part and a data transmission part, wherein said data transmission part associates a user identifier for identifying a user with said management data to send to said server device, wherein said page generation part receives said management data from said plurality of user terminals to store in said server device as a user data group, wherein when a reference-target user is designated, said user page reference part generates a user page request that includes a user identifier for identifying said reference target user and sends said user page request to said server device, wherein when said server device receives said user page request, said page generation part refers to said user data group, extracts reference user data•that corresponds to said reference-target user, and sends said reference user data to said each user terminal, and wherein said user page reference part displays said reference user data on said display screen.

10. The numerical value management system according to claim 9, wherein said each user terminal is accessibly connected with a bulletin board server, and wherein said data transmission part sends said title data to said bulletin board server.

11. The numerical value management system according to claim 9, wherein said data compilation part calculates ranking of said numerical value for each user identifier based on said user data group, and generates ranking information indicating a relationship between said user identifier and said ranking, wherein said page generation part generates ranking screen data based on said ranking information and sends said ranking screen data to said each user terminal, and wherein said title reference part displays said ranking screen data on said display screen.

12. The numerical value management system according to claim 1, wherein said new registration part adds regional information indicating a location of said each user terminal to said title data to send to said server device, wherein said title compilation part generates regional data indicating a relationship between said location and said number of creating users, based on said regional information, wherein said page generation part sends regional screen data indicating said regional data to said each user terminal, and wherein said title reference part displays said regional, screen data on said display screen.

13. The numerical value management system according to claim 1, wherein said input style is set to a ten-key style or a count style.

14. The numerical value management system according to claim 13, wherein said new registration part generates said title data including a public/nonpublic in addition to said title name and said input style, and when said public/nonpublic is set to "public", sends said management data to said server device, wherein said server device further comprises a server storage part, and wherein said page generation part obtains said management data, and stores said management data as a user data in said server storage part, and receives a user page request which is a user's reference-target from said each of said plurality of user terminals, and sends said user data of said server storage part and said title data corresponding to said user's reference-target as a reference user data which indicates a title name and a numerical data.

15. The numerical value management system according to claim 13, wherein said input style is set to said count style, wherein said each of said plurality of user terminals further comprises a touch panel including an input region on a screen, wherein said numerical data input part is configured to carry out a display of an image of an object to said input region of said touch panel display, and when said input region is pushed down by a part of user's body, to change said image of said object displayed on said input region to an image showing a broken object, and to count the number of times of said pushing down, and to store said number of times as said numerical data in said storage part.

16. A server device used in a numerical value management system, wherein said numerical value management system comprises:

a server device comprising a title compiling part and a page generation part; and a plurality of user terminals, each of which is accessibly connected with said server device and comprises a new registration part and a title reference part, wherein said each of said plurality of user terminals further comprises a numerical data input part and a storage part, wherein said new registration part is configured to generate title data including a title name of management data and an input style, and to store said title data in said storage part, and to send said title data to said server device, when said title name and said input style are inputted into each of said plurality of user terminals, wherein said numerical data input part is configured to display an input screen corresponding to said title name and said input style on a display screen, and to store inputted numerical data as said management data to said storage part, wherein said title compilation part is configured to count a number of users who create said title data for each title name and for each input style based on title data group obtained from said plurality of user terminals to generate title-compilation data indicating a relationship between said title name and a number of creating users, wherein said title reference part is configured to send a high-order title reference request to said server device, wherein said page generation part is configured to generate high-order title screen data indicating title names in descending order of said number of creating users based on said title compilation data to send said high-order title screen data to said each user terminal when said server device obtains said high-order title reference request, wherein said title reference part is configured to display said high-order title screen data on said display screen, wherein when a title name shown in said high-order title screen data is designated by a user as a designated title name, said new registration part sends a transmission request indicating said designated title name to said server device, wherein when said title compilation part receives said transmission request, said title compilation part sends designated title data corresponding to said designated title name to said each user terminal, wherein said numerical data input part stores said title data from said title compilation part of said server device in said storage part, and wherein said new registration part sends said title data stored in said storage said server device.

17. A user terminal used in a numerical value management system, wherein said numerical value management system comprises:

a server device comprising a title compiling part and a page generation part; and a plurality of user terminals, each of which is accessibly connected with said server device and comprises a new registration part and a title reference part, wherein said each of said plurality of user terminals further comprises a numerical data input part and on storage part, wherein said new registration part is configured to generate title data including a title name of management data and an input style, and to store said title data in said storage part, and to send said title data to said server device, when said title name and said input style are inputted into each of said plurality of user terminals, wherein said numerical data input part is configured to display an input screen corresponding to said title name and said input style on a display screen, and to store inputted numerical data as said management data to said storage part, wherein said title compilation part is configured to count a number of users who create said title data for each title name and for each input style based on title data group obtained from said plurality of user terminals to generate title compilation data indicating a relationship between said title name and a number of creating users, wherein said title reference part is configured to send a high-order title reference request to said server device, wherein said page generation part is configured to generate high-order title screen data indicating title names in descending order of said number of creating users based on said title compilation data to send said high-order title screen data to said each user terminal when said server device obtains said high-order title reference request, wherein said title reference part is configured to display said high-order title screen data on said display screen, wherein when a title name shown in said high-order title screen data is designated by a user as a designated title name, said new registration part sends a transmission request indicating said designated title name to said server device, wherein when said title compilation part receives said transmission request, said title compilation part sends designated title data corresponding to said designated title name to said each user terminal, wherein said numerical data input part stores said title data from said title compilation part of said server device in said storage part, and wherein said new registration part sends said title data stored in said storage part to said server device.

18. A method for managing a numerical value, comprising:

generating title data including a title name of management data and an input style, storing said title data in a storage part, and to sending said title data to a server device, by using each of a plurality of user terminals;

wherein said each of said plurality of user terminals further comprises a numerical data input part and a storage part, counting a number of users who create said title data for each title name based on title data group obtained from said plurality of user terminals to generate title compilation data indicating a relationship between said title name and a number of creating users, by using said server device;

sending a high-order title reference request to said server device, by using said each user terminal;

receiving-said high-order title reference request and generating high-order title screen data indicating title names in descending order of said number of creating users based on said title compilation data to send said high-order title screen data to said each user terminal, by using said server device;

displaying said high-order title screen data on said display screen, by using said each user terminal wherein when a title name shown in said high-order title screen data is designated by a user as a designated title name, sending a transmission request indicating said designated title name to said server device, wherein upon receiving said transmission request, sending designated title data corresponding to said designated title name to said each user terminal, storing said title data in said storage part, and sending said title data stored in said storage part to said server device.

19. A computer readable non-transitory recording medium in which a computer-executable program code is stored to attain a method for managing a numerical value, which comprises:

generating title data including a title name of management data and an input style, storing title data in a storage part, and sending said title data to a server device, by using each of a plurality of user terminals;

wherein said each of said plurality of user terminals further comprises a numerical data input part and a storage part, counting a number of users who create said title data for each title name based on title data group obtained from said plurality of user terminals to generate title compilation data indicating a relationship between said title name and a number of creating users, by using said server device;

sending a high-order title reference request to said server device, by using said each user terminal;

receiving said high-order title reference request and generating high-order title screen data indicating title names in descending order of said number of creating users based on said title compilation data to send said high-order title screen data to said each user terminal, by using said server device;

displaying said high-order title screen data on said display screen, by using said each user terminal wherein when a title name shown in said high-order title screen data is designated by a user as a designated title name, sending a transmission request indicating said designated title name to said server device, wherein upon receiving said transmission request, sending designated title data corresponding to said designated title name to said each user terminal, storing said title data in said storage part, and sending said title data stored in said storage part to said server device.

* * * * *